United States Patent

Wiik

[11] Patent Number: 5,702,746
[45] Date of Patent: Dec. 30, 1997

[54] PROCESS OF CONVERTING FOOD WASTE TO RE-HYDRATABLE EDIBLE FOOD

[76] Inventor: Rolf Wiik, 1574 Aluna Way, Escondido, Calif. 92027

[21] Appl. No.: 655,154

[22] Filed: May 28, 1996

[51] Int. Cl.$^6$ ........................................... A23L 3/00
[52] U.S. Cl. ..................... 426/248; 426/465; 426/518
[58] Field of Search ............................. 426/248, 237, 426/518, 465; 422/24; 241/23, 25

[56] References Cited

U.S. PATENT DOCUMENTS

| | | | |
|---|---|---|---|
| 5,346,714 | 9/1994 | Peters | 426/465 |
| 5,352,471 | 10/1994 | Kusano et al. | 426/518 |

Primary Examiner—George Yeung
Attorney, Agent, or Firm—John J. Murphey; Murphy Law Offices

[57] ABSTRACT

A process of converting food waste to a dry rehydratable, edible food material, including the steps of collecting large quantities of edible food and food scraps at one location, feeding food and food scraps to a device for chopping to comminute the food and food scraps to a mixture of food pieces, feeding the mixture of food pieces to a device for grinding the mixture to a flowable mixture of homogeneous food particles, feeding the flowable mixture of homogeneous food particles to a filter to extract a portion of liquid therefrom to product a more flowable mixture of homogeneous food particles, subjecting food particles to intimate contact with ultra-violet radiation to kill unwanted bacteria and viruses in the mixture, feeding an irradiated mixture of homogeneous food particles to a drying device for drying the mixture of food particles to a dry mixture of homogeneous food particles that are packageable and later rehydratable with addition of liquid.

16 Claims, 4 Drawing Sheets

PROCESS OF CONVERTING FOOD WASTE TO RE-HYDRATABLE EDIBLE FOOD

BACKGROUND OF THE INVENTION

1. Field of the Invention

This invention pertains to the field of food processing. More particularly, the invention pertains to a process of converting food and food waste to rehydratable edible food using a process that can be a stationary unit, such as in a grocery store, or mounted on a vehicle and moved to areas of society where large quantities of food scraps are available on a timely basis.

2. Description of the Prior Art

It has been postulated that the world has the ability, namely the land, rainfall, materials and technology, to grow sufficient food to feed all the people therein. However, this has not been accomplished at any time in our history. One of the reasons is the geographical dislocation of land and rainfall, i.e., in some lands there is too much rain and in other lands there is too little rain.

However, there are certain portions of the planet where sufficient food is being grown to feed all the peoples of that particular region yet many of them are left without sufficient food to survive. One of those regions is North America. There is food raised and foodstuffs produced sufficient to feed all the people in North America yet there are areas therein, such as in the Appalachian Mountains and in the streets of large cities, where there is not enough edible food to sustain the inhabitants.

Part of the reason for this state of affairs is the failure of food suppliers to conserve food distribution such that all the inhabitants can get their fill. Another part of the reason is that food scraps and unwanted but edible food parts are discarded and allowed to rot thereby preventing their use as sustenance materials. If one visits restaurants, buffets, school cafeterias, grocery stores, etc., one will see left-over food on plates, food cooked but not served, food held unsold past its expiration date, and such that constitute a rather large amount of edible food that is not used and discarded as garbage.

The prior art has tried to establish processes for recovery of materials from solid refuse, methods for processing food waste, apparatuses for processing garbage, etc. U.S. Pat. Nos. 3,858,505; 3,871,291; 3,911,808; and 4,072,273 all disclose processes and apparatuses for processing food waste. However, none of these processes have ever been commercially acceptable. There are a number of reasons for this, but probably the main one is that the apparatus using the process is of such great capital expenditure, bringing the unused food and solid waste to it, rather than having it go to areas where the solid waste is produced, is the only feasible manner of operating the device, and the expenditure of money for such transportation brings the operating costs to such a high level that the whole operation becomes commercially unsuccessful.

There are many other reasons for failure of these processes and apparatuses from achieving commercial acceptance. One is that the material going into the feed of the process does not discriminate between edible and non-edible products. That is to say the feed in some cases may comprise food scraps, such as unused or uneaten potatoes, tomatoes, salad, etc. as well as paper napkins, cardboard cartons, etc. While all of this material may be processed into an edible food-stuff, the fact remains that the end products will contain a small or larger proportion of initially non-edible materials made edible by the process or apparatus.

Another reason for failure of these processes and apparatuses is that the end product may not have an aesthetic appearance or an aesthetic taste. In a previous experiment, sponsored by the United States Government in the 1950's, whole fish were dried and then pulverized to a very fine mesh to produce a grayish colored powder the consistency of cake flour. The product was somewhat smelly but extremely nutritious because it contained a large percentage of protein as well as a wealth of minerals. This process and the product produced therefrom never obtained commercial acceptance because of the non-white color, the odor, and the fact that it contained the entire body of the fish, including the entrails. The nutritional value of the product was never accepted because of these other, less important, but nevertheless aesthetic considerations.

SUMMARY OF THE INVENTION

This invention is a process of converting food and food waste to a dry, rehydratable, edible food material, comprising the number of active steps such as collecting the material at a location, feeding the material to a chopping machine for comminuting the material into a mixture of food pieces, grinding the pieces to form a pulverized material, de-watering the materials to remove much of the liquid, irradiating the food particles to kill all bacteria and viruses that may be in the food, and then drying and possibly regrinding the particles to produce a free-flowing, dehydrated material. This material can subsequently be made edible again by merely adding sufficient hot water to the product to re-hydrate it into a liquid that can be used as soup or soup base, as an additive in foods, such as in meat loaf and the like.

The apparatus that performs this process may be stationary or mounted on a vehicle, such as a truck bed, and moved from place to place where restaurants, grocery stores, school cafeterias, churches, and the like, provide food or to events, such as bar mitzvahs, parties, barbecues, and wedding receptions to obtain the unserved and uneaten food as feed stock to the process. The amount of power used in the process and in the apparatus depends upon the amount of feed stock and the speed with which it is to be processed. By carefully monitoring each operation in the apparatus, such as with a computer, each step in the process can be controlled so that power consumption is carefully controlled. This invention may also be housed in a small cabinet of a size usable in the kitchen of a modern home. In this environment the food and food scraps, that may normally flushed down the drain, through the garbage disposal, may be recaptured for conversion to an edible food product to help the family control the costs of raising children and feeding the entire family.

The final product is one that may be packaged and stored without refrigeration, that may be easily shipped to areas where food supplements are needed, and used where the simple act of adding water to the product will product a hydrated product immediately available for consumption. The removal of water from the product prior to bagging or packaging it provides the dual benefit of reducing the weight in the final product, so that more material can be shipped per a given freight account, and the dryness helps preserve the product by denying an environment where bacteria can breed. Further, the breadth of materials fed to the process will control the vitamin and mineral content of the final product. These vitamins and minerals, recaptured from the food processed by this invention, will not only make the family more healthy but will reduce the family's dependency on store-purchased vitamins and minerals thus saving additional money that can be used for other purposes.

In addition, this process will remove a like amount of food waste from the garbage cans and recycle bins so that there will be a concomitant reduction in load in these other processes of dealing with food waste. Most of this reduction will show up as a reduction in volume of the waste to be handled, trucked, and applied to city and county land fills. All of these benefits will be shown in greater degree when this invention is used to produce food stuffs for feeding populations such as prisoners. The United States prison system is suffering with high costs of keeping its inmates, especially in the area of foods. With this process, the prison population may be fed at a greatly reduced cost thereby eliminating some of these exorbitant costs.

Accordingly, the main object of this invention is a process of treating food, food waste, and food scraps to produce an edible product. Other objects of the invention include a process of providing more edible food where none existed in any form except non-edible garbage; a process of saving the nutritional value of food stuffs and converting them into a form that may be used to supplement the nutritional intake of other persons; a process of reducing the amount of food scrap that is deposited in land fills so as to save the environment; a process that involves a plurality of individual steps that treat the food scraps and reduce them to a common particle size in a form that is amenable to further processing; a process of treating food stuffs to reduce them to a particle size wherein further treatment of the particles by other processes is accomplished in a level dosage so as not to over-treat one segment of the particles and under-treat another segment; a process that is usable as a stationary unit or mountable on a vehicle that may be moved on the streets and roadways of the country to reach food stuffs in areas of concentrated food preparation such as restaurants, schools, cafeterias and stores; a process of moving a process from one area of any given geographical area to another to take advantage of food delivery times and food preparation times so as to obtain the maximum amount of nutritional value from the food scraps as possible; and a process that may be controlled and managed by persons without enhanced training or require enhanced skills so that it is open to use by a larger cross-section of the population. Still further objects of this invention include a means of capturing the nutritional value of foods and food waste and recycle it for the benefit of individuals, families, and concentrations of individuals, such as in prisons, so that the extant high costs of such maintenance may be attenuated and the savings moved on to others aspects of their care. Still other objects of the invention include a process of treating food and food scrap to remove the foul odors that are normally associated with such material.

These and other objectives may be gleaned from a close reading the Description of the Preferred Embodiment taken together with the drawings appended hereto. The scope of protection sought by the inventor may be gleaned from a fair reading of the Claims that conclude this Specification.

DESCRIPTION OF THE DRAWINGS

FIG. 6 is a close-up view of another embodiment of a portion of the invention showing additional ultra violet radiation being applied to the dried particle-sized food stuffs as it exits the drying means;

DESCRIPTION OF THE PREFERRED EMBODIMENT

Figure 1:
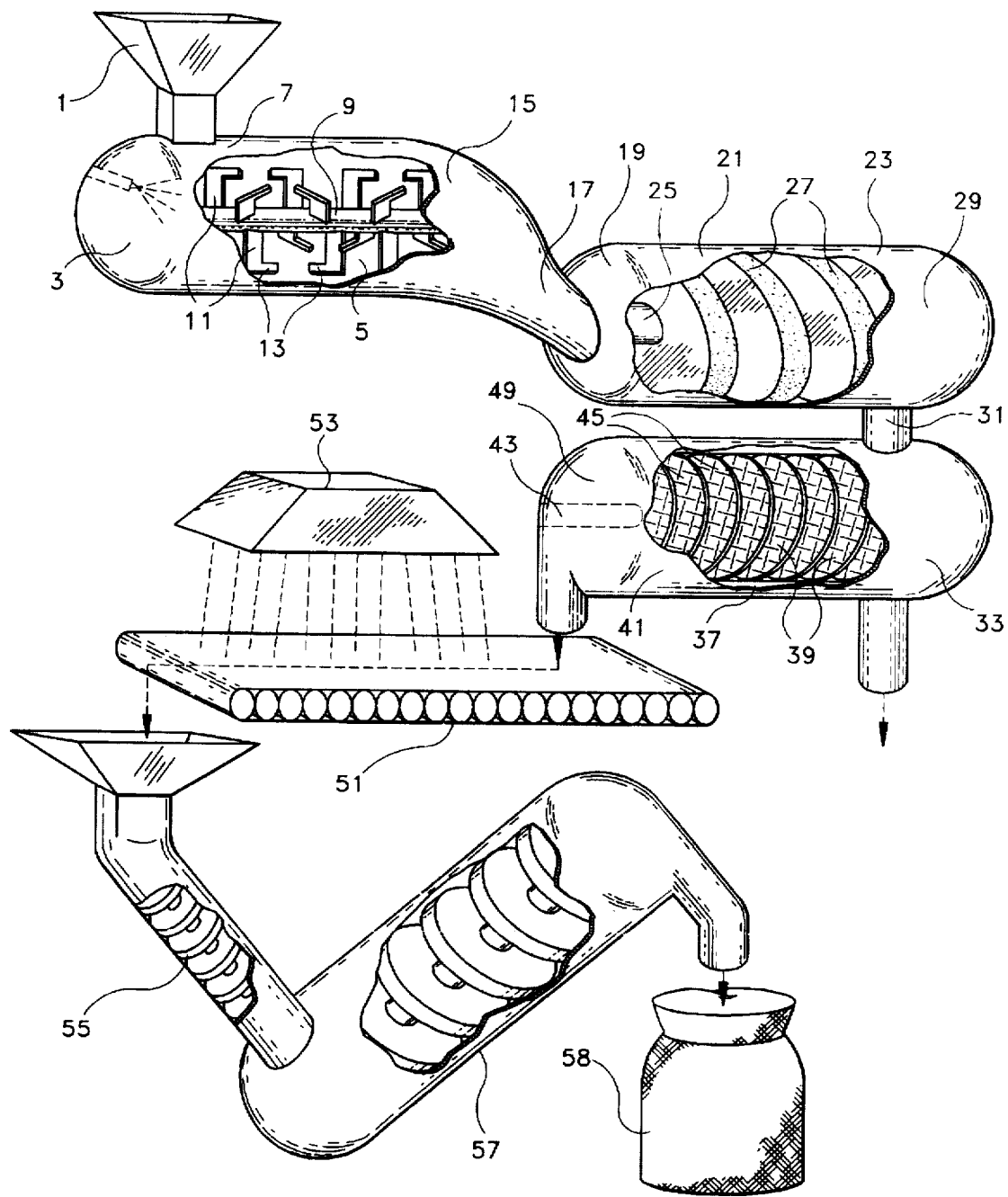
FIG. 1 is a schematic view, partially in section, of the preferred embodiment of the process of this invention.

Turning now to the drawings, wherein like elements are identified by like numerals throughout the nine figures, FIG. 1 shows the preferred embodiment of this invention to comprise various apparatus such as a feed funnel 1 that is used for collecting large quantities of edible food and food scraps at one location such as a series of restaurants, cafeterias, church meetings, night clubs, food distribution centers, or events where large amounts of food are being served such as barbecues, bar mitzvahs, weddings, etc. The food scraps may be left over vegetables, such as tomatoes, beets, carrots, or breads or meats, etc. and all may be loaded into funnel 1 by merely throwing the material into the funnel or loading it with more efficient equipment such as shovels or pallets for a front end loader of common design.

The mass of edible food stuffs is fed by funnel 1 into one end 3 of a chopper 5, that generally comprises a cylindrical tank 7, arranged horizontally with a central shaft 9 passing axially therethrough. A plurality of short legs 11 extend outward from shaft 9 and contain one or more chopping elements 13 that rotate with shaft inside tank 7 and chop the food stuffs charged thereinto into smaller pieces of material that become a mass of large-size particles. Tank 7, shaft 9, legs 11 and chopping elements 13 are generally made of food-grade stainless steel, to meet health codes, and the speed of rotation of said shaft depends upon the style of legs 11 and the design of chopping elements 13. Various types of such food choppers are available on the open market, many of which can perform the operation herein described.

The design of chopper 5 provides a driving force to the food stuffs and drives them from the feed end 3 of tank 7 toward the opposite end 15. Tank end 15 is formed into a feeding tube 17 that aids the chopped food stuffs to be introduced to one end 19 of a grinder 21. A typical grinder for this operation comprises another cylindrical stainless steel tank 23 arranged horizontally with a central axis 25 passing axially therethrough on which are mounted a series of grinding wheels 27 that contact the food scraps and grind or pulverize them against the inside surface of tank 23 to comminute the chopped food pieces into a flowable mixture of homogeneous food particles.

The design of these food grinders provides a flow of particulate matter therethrough from feed end 19 to the opposite dispenser end 29. This is generally accomplished by designing the grinder to move in a slightly spiral manner so as to move the food particles through the grinding stage and horizontally along tank 23 to dispenser end 29 wherein the particles may exit said grinder through an exit hole 31.

Most food stuffs come with a certain percentage of water or liquid content; often each of the particular foods having its own inimitable liquid content. At this point in the overall process it is wise to reduce this liquid content so as to make the food particles amenable to later radiation treatment as will hereinafter be more fully described. The de-watering step is accomplished by passing the comminuted particles into the feed end 33 of a de-watering filter 37 and past a series of filter plates 39 that draw the water or other liquid from the particles either by vacuum, by mechanical pressing or by centrifuge action. The design of de-watering filters is again a food grade stainless steel tank 41, arranged horizontally and having a central shaft 43 on which filter plates 39 or de-watering press wheels 45 are arranged for movement thereabout. The chopped, ground and de-watered food stuffs now are in the form of a flowable mixture of homogeneous food particles. This dewatering step may be performed at other locations in the overall process, depending upon the water content of the feed material.

The design of these types of de-watering devices is such that the material is moved progressively from the feed end 33 of tank 41 along its entire length to a dispenser end 49 by arranging the filtering wheels or plates to create a spiral effect and push the product therealong. At dispenser 49, the dryer, homogeneous mixture of food particles now exits and is dropped onto or otherwise introduced to one end of a conveyor belt 51 or other transportation device to pass under an ultra violet irradiation unit 53 so that the food particles are exposed to the radiation for the purpose of killing or rendering inert any bacteria or viral influences that may have been introduced or germinated in the food product as well as reducing or eliminating the foul odor usually associated with food waste. It is rather obvious that when food has been left out, i.e., without retarding refrigeration, there is a certain amount of damage that will occur because of air-borne bacteria that attacks the food and is fed by the sugars and other nutrients in the food. Ultra violet radiation is generally accepted as a safe and efficient means of terminating the growth, the hazard and the spreading of these microorganisms.

In the preferred embodiment, the dry, free flowing comminuted food particles leave the ultra violet radiation area and are passed by gravity or feed mechanisms, such as a screw feeder 55, to a rotary kiln 57 where the particles are further dried into a free-flowing mass of food particles that may be easily conveyed to a bagging stand 58 for bagging or packaging for further use. As has been experienced with a wide variety of different food particles, food that has its water or other liquid removed will readily re-hydrate by the simple addition of water or other wetting liquid. In some cases a food additive, such as lecithin, may be added to enhance the take-up of water in the re-hydration step.

Certain alternative embodiments are sometimes necessary due to the particular make-up of the food stuff, such as in the case where there is a greater percentage of protein in the form of meat, or a greater percentage of sugar, such as in the use of breads and candy, or in the case of increased carbohydrates, such as when pastas and beans are in the feed.

Figure 2:
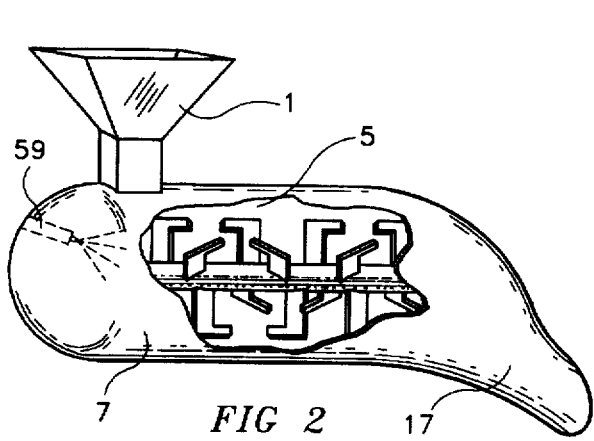
FIG. 2 is a close-up view of another embodiment of a portion of the invention showing water being sprayed on the chopped food stuffs to clear the chopper means.

As shown in FIG. 2, an overly dry feed stock may require the addition of a spray of water or other liquid through a wand 59 mounted inside chopper tank 5. This spray of liquid can be used to prevent balling up of dried food stuffs in the chopping elements and promote the orderly flow of the chopped food to the next stage.

Figure 3:
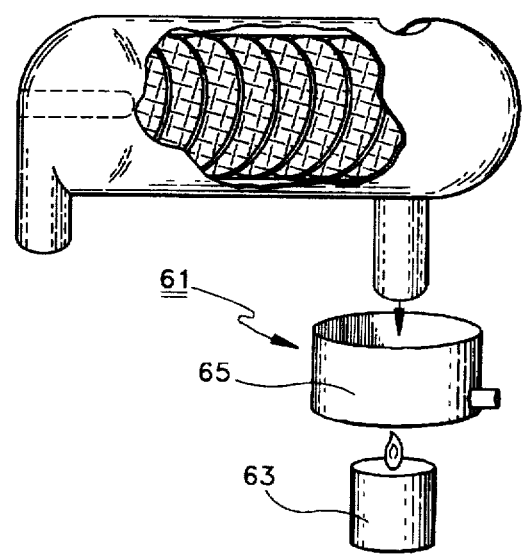
FIG. 3 is a close-up view of another embodiment of a portion of the invention showing water being removed from the processed food stuffs.

This liquid can be allowed to remain in the processed food particles or removed, depending upon the action of the material as it passes further through the entire process. As shown in FIG. 3, the spray water or spray liquid, as well as water or liquid entrapped or a part of the original feed stock, can be removed from the grinding operation, prior to the filtration process, and passed to a means 61 for de-watering the stream of liquid. De-watering means 61 is shown in FIG. 3 to comprise a heater 63 for heating the extracted liquid past its boiling point and allowing the boilable liquids to escape to concentrate the materials left in the catch container 65. The liquid saved from this de-watering operation may be reintroduced into the food particles at a later stage in the process to supplement or raise the nutritional level in the final product. In other situations, the liquid may be used for other processes such as in baking and the like.

Figure 4:
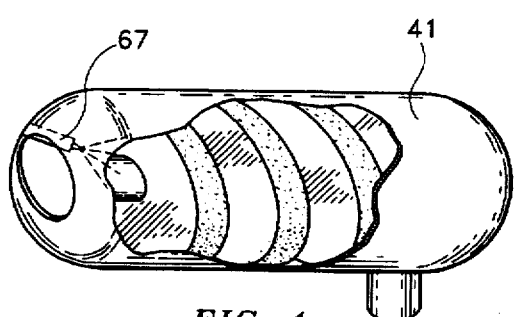
FIG. 4 is a close-up view of another embodiment of a portion of the invention showing water being sprayed on the ground food stuffs to clear the grinding means.

The step of filtering the comminuted food particles may also require a small amount of water or of de-watered extract to loosen the filtered material from the elements. As shown in FIG. 4, a spray of water or other liquid 67 may be used to dislodge the filtered material from tank 41. The amount of liquid used in this step should not be as much as that extracted or the filtering step will be effectively nullified.

Figure 5:
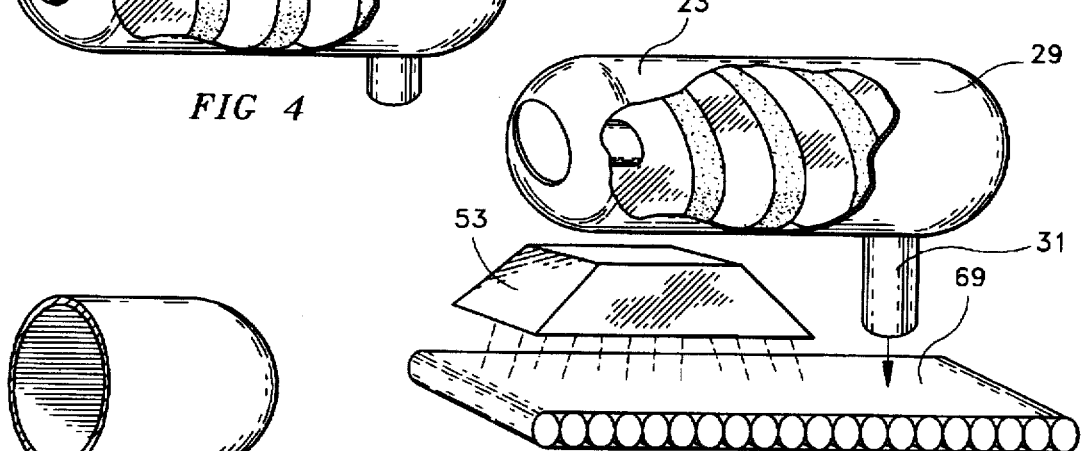
FIG. 5 is a close-up view of another embodiment of a portion of the invention showing additional ultra violet radiation being applied to the particle-sized food stuffs as it exits the grinding means.

In some cases the bacterial content in the product is such that the step of exposure to ultra violet radiation must be accomplished more than once. As shown in FIG. 5, the product that is dispensed from the grinding step is dropped onto a conveyor belt 69 or other transportation device and passed under another ultra violet radiation unit 53. This increases the exposure of the particles to the radiation and improves the killing rate of bacteria in the product.

Still further, even other places in the process are amenable to further ultra violet radiation. As shown in FIG. 6, the dried product exiting drying kiln 57 is again dropped onto a conveyor belt 69 or other transportation device and passed under an ultra violet radiation unit 53 so that the product is again drenched in radiation. In addition to ultra violet radiation, in certain cases there may be a need for exposure to other forms of radiation, such as neutron radiation, to insure that the food product has been sufficient treated to kill off all varieties of bacteria and viral traces.

Figure 7:
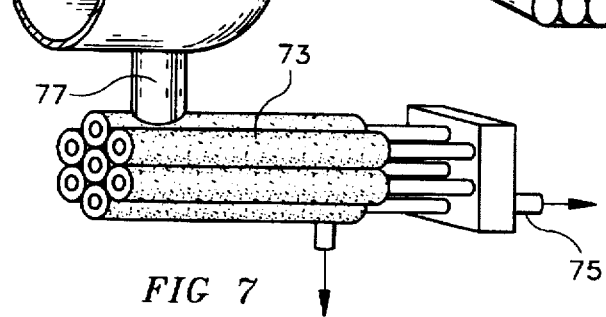
FIG. 7 is a close-up view of another embodiment of a portion of the invention showing the extracted liquid being de-watered through a reverse osmosis unit as it exits one of the stages.

Other types of de-watering of the recovered liquid may be used, especially where there is an intolerance to high temperature exposure of the liquid. Further, where nutritional value is increased, exposure to high temperatures is not always desirable. As shown in FIG. 7, the water or liquid stock may be passed to a reverse osmosis unit 73 where potable water or other liquid stream 75 is separated from the feed liquid 77 whereby it is concentrated. Reverse osmosis is a process whereby a feed liquid is placed against a semi-permeable membrane and pressure is applied sufficient to overcome the natural osmotic pressure and allow smaller ions to pass across the membrane into a new stream of clarified or otherwise chemically changed liquid. As shown in FIG. 7, the liquid 77 extracted from the food stuffs or from them and the spray streams, may be effectively concentrated to a smaller volume and, simultaneously, the nutrient value of the liquid raised.

Figure 8:
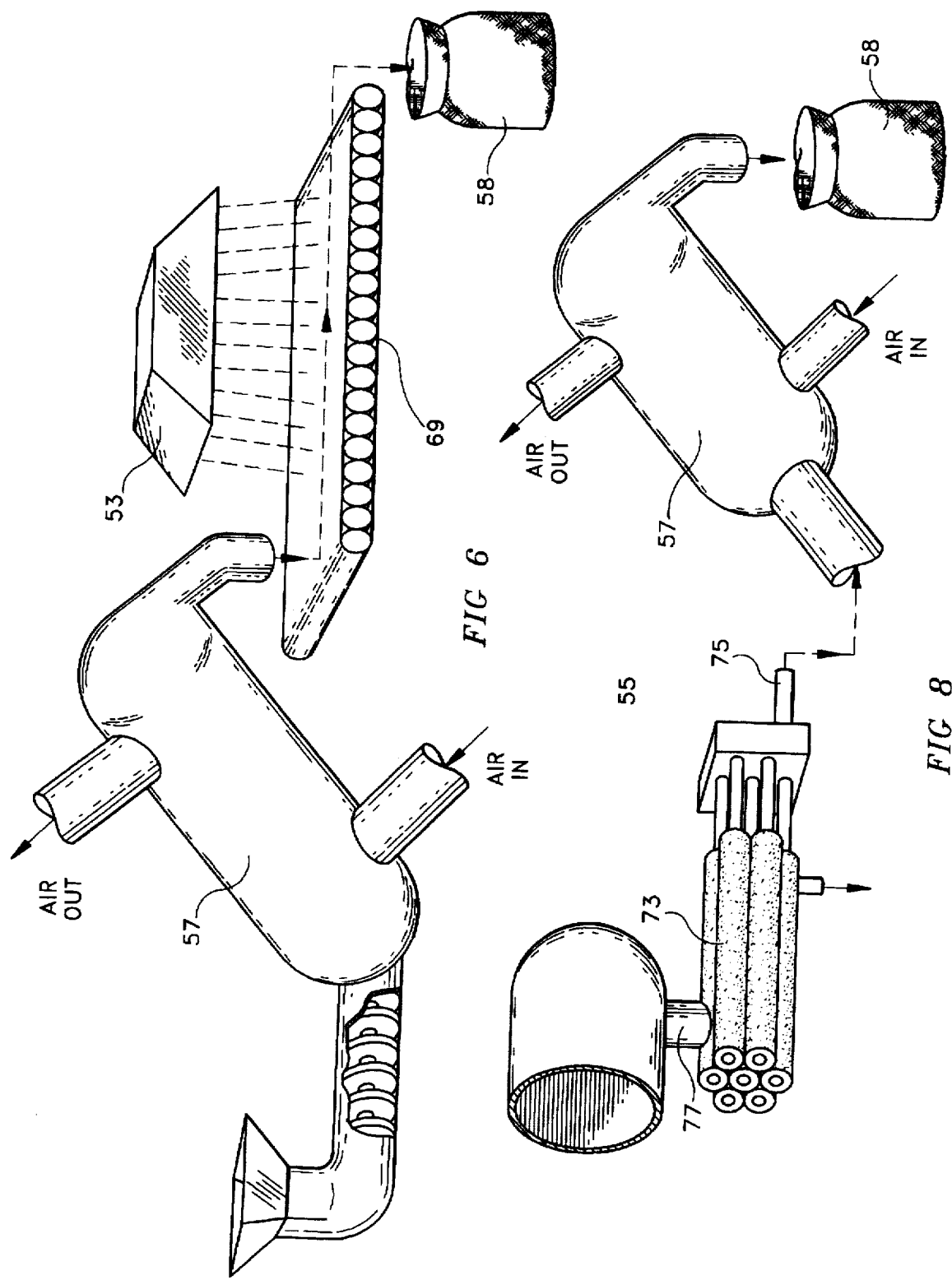
FIG. 8 is a close-up view of another embodiment of a portion of the invention showing the extracted liquid being de-watered through a reverse osmosis unit as it exits one of the stages and thereafter added back into the particle-sized food stuffs to enhance the nutritional value thereof; and, FIG. 9 is a close-up view of another embodiment of the invention showing the entire process mounted on a moving vehicle, such as a truck, for moving the process to various centers of food scrap distribution.

As shown in FIG. 8, the de-watered stream may then be introduced into other areas of the process such as to screw feeder 55 where it is added to the comminuted food stuff just as the food stuffs progress into drying kiln 57. This alternative embodiment raises the nutrient value of the final product and allows the processed food to bring about a better result in feeding people or animals.

Figure 9:
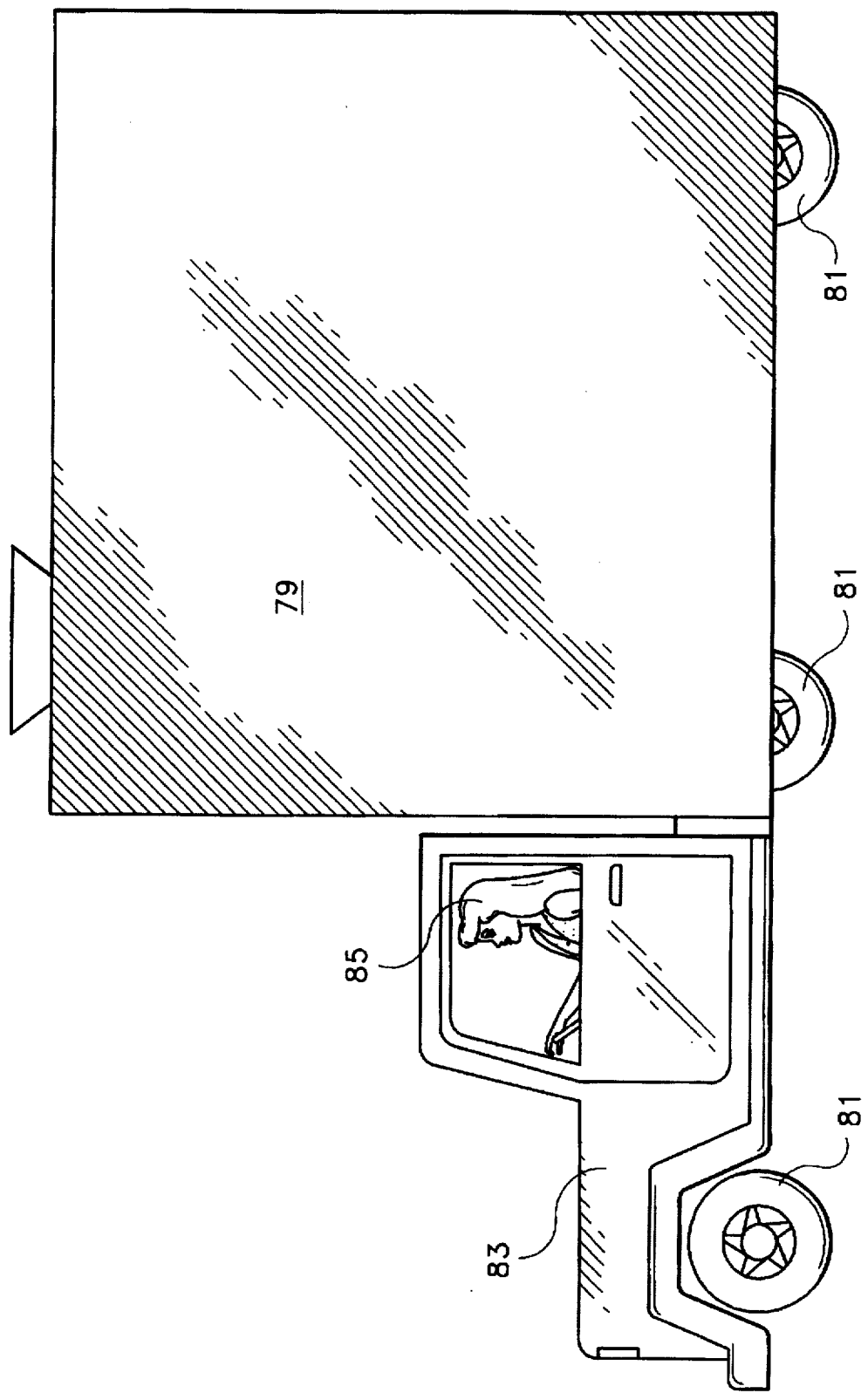

Finally, as shown in FIG. 9, the whole process of this invention may be conveniently mounted on a truck 79 or other vehicle having wheels 81 and a motor 83 to propel the vehicle from place to place as driven by a driver-operator 85. It is believed one person can drive vehicle 79 to places where food and food scraps are in concentrated amounts, load the food into feed funnel 1 and operate the entire process to produce the dry, free-flowing, rehydratable powdered food product which can thereafter be packaged and sent to areas where sufficient food stuffs are in short supply.

While the invention has been described with reference to a particular embodiment thereof, those skilled in the art will be able to make various modifications to the described embodiment of the invention without departing from the true spirit and scope thereof. It is intended that all combinations of elements and steps which perform substantially the same function in substantially the same way to achieve substantially the same results are within the scope of this invention.

What is claimed is:

1. A process of converting food waste to a dry, rehydratable, edible food material, comprising the steps of:
   a) collecting large quantities of edible food and food scraps at one location;
   b) feeding said food and food scraps to means for chopping to comminute the food and food scraps to a mixture of food pieces:
   c) feeding said mixture of food pieces to means for grinding said mixture to a flowable mixture of homogeneous food particles;
   d) feeding said flowable mixture of homogeneous food particles to a filter to extract a portion of liquid therefrom to produce a more flowable mixture of homogeneous food particles;
   e) subjecting said food particles to intimate contact with ultra-violet radiation to kill unwanted bacteria and viruses in the mixture; and,
   f) feeding said irradiated mixture of homogeneous food particles to drying means for drying said mixture of food particles to a dry mixture of homogeneous food particles that are packageable and later rehydratable with addition of liquid.

2. The process of claim 1 including the further step of spraying a quantity of water on the food scraps when they are fed to said means for chopping to comminute the food and food scraps to aid in preventing the food and food scraps from binding in said chopping means.

3. The process of claim 1 including the further step of removing said extracted liquid from said process.

4. The process of claim 1 including the further step of spraying a quantity of water on the food scraps when they are fed to said means for grinding said mixture to a flowable mixture of homogeneous food particles to aid in preventing the flowable mixture of homogeneous food particles from binding in said grinding means.

5. The process of claim 1 including the further step of subjecting said food particles passing from said grinding to intimate contact with ultra-violet radiation to kill unwanted bacteria and viruses in the mixture.

6. The process of claim 1 including the further step of subjecting said dried food particles to intimate contact with further ultra-violet radiation to further kill unwanted bacteria and viruses in the mixture.

7. The process of claim 3 including the further step of de-watering said extracted liquid to concentrate same.

8. The process of claim 7 further including the step of reintroducing said concentrated extracted liquid into said food particles as they are passed into said drying means for increasing the nutrient value of the dried mixture of food particles.

9. A process of converting food waste to a dry, rehydratable, edible food material, comprising the steps of:
   a) providing a moveable vehicle capable of supporting large bins for collecting food and food scraps therein, mechanical equipment means for chopping the food and scraps, and means for grinding the chopped food and scraps;
   b) collecting large quantities of edible food and food scraps at various locations and temporarily storing them in said bins located on said vehicle;
   c) feeding said food and food scraps to said means for chopping to comminute the food and food scraps to a mixture of food pieces:
   d) feeding said mixture of food pieces to said means for grinding said mixture to a flowable mixture of homogeneous food particles;
   e) feeding said flowable mixture of homogeneous food particles to a filter located on said vehicle to extract a portion of liquid therefrom to produce a more flowable mixture of homogeneous food particles;
   f) subjecting said food particles to intimate contact with an ultra-violet radiation device located on said vehicle to kill unwanted bacteria and viruses in the mixture; and,
   g) feeding said irradiated mixture of homogeneous food particles to drying means located on said vehicle for drying said mixture of food particles to a dry mixture of homogeneous food particles that are packageable and later rehydratable with addition of liquid.

10. The process of claim 9 including the further step of spraying a quantity of water on the food scraps when they are fed to said means for chopping to comminute the food and food scraps to aid in preventing the food and food scraps from binding in said chopping means.

11. The process of claim 9 including the further step of removing said extracted liquid from said process.

12. The process of claim 9 including the further step of spraying a quantity of water on the food scraps when they are fed to said means for grinding said mixture to a flowable mixture of homogeneous food particles to aid in preventing the flowable mixture of homogeneous food particles from binding in said grinding means.

13. The process of claim 9 including the further step of subjecting said food particles passing from said grinding to intimate contact with ultra-violet radiation to kill unwanted bacteria and viruses in the mixture.

14. The process of claim 9 including the further step of subjecting said dried food particles to intimate contact with further ultra-violet radiation to further kill unwanted bacteria and viruses in the mixture.

15. The process of claim 11 including the further step of de-watering said extracted liquid to concentrate same.

16. The process of claim 15 further including the step of reintroducing said concentrated extracted liquid into said food particles as they are passed into said drying means for increasing the nutrient value of the dried mixture of food particles.

* * * * *